United States Patent [19]
Bryan

[11] Patent Number: 5,132,077
[45] Date of Patent: Jul. 21, 1992

[54] LOWER END FITTING

[75] Inventor: William J. Bryan, Granby, Conn.

[73] Assignee: Combustion Engineering, Inc., Windsor, Conn.

[21] Appl. No.: 582,564

[22] Filed: Sep. 14, 1990

[51] Int. Cl.[5] ............................................. G21C 1/04
[52] U.S. Cl. ................................. 376/352; 376/443; 376/451; 376/287
[58] Field of Search .............. 376/451, 287, 364, 444, 376/443, 352

[56] References Cited

U.S. PATENT DOCUMENTS

| 4,071,403 | 1/1978 | Andrews et al. | 376/281 |
| 4,127,445 | 11/1978 | Anthony | 376/364 |
| 4,231,843 | 11/1980 | Myron et al. | 376/352 |
| 4,997,621 | 3/1991 | Johansson et al. | 376/444 |

Primary Examiner—Brooks H. Hunt
Assistant Examiner—Meena Chelliah
Attorney, Agent, or Firm—John H. Mulholland

[57] ABSTRACT

An improved lower end fitting (L.E.F.) having a bell mouth type of flow jet diffuser decrease pressure drop 10-15%, more evenly distributes flow and adds strength. It includes neutron thimble flux impingement shield of instrument and/or cable. Diffusers are stainless steel of circular cross-sect. and parabolic to optimize diffusion. Shape is based on lower core plate flow hole geometry, L.E.F. design and reactor flow rate. Thinner L.E.F. legs, smaller L.E.F. gussets and thinner L.E.F. flow plates possible.

2 Claims, 4 Drawing Sheets

LOWER END FITTING

BACKGROUND OF THE INVENTION

The invention relates to pressurized water nuclear reactors and is for use in the same environment as U.S. patent application Ser. No. 07/582,589, filed substantially concurrently herewith, by the same inventor, for "Bottom Nozzle to Lower Grid Attachment". More specifically, the device relates to the lower core plate to fuel assembly interface.

The invention is a design created more evenly to distribute the flow within and above the lower end fitting to decrease the jet flow impingement on fuel rods. This improves reactor performance by improving the performance diffusing lower core plate flow jets. The desired result sought and achieved is a decrease of flow induced vibration of the fuel rods and stiffening and lightening of the lower end fitting. In the past, flow induced vibration of fuel rods in their lower spans has caused high fuel rod wear rates. This has resulted in the use of a stronger grid support system in the lower section of the fuel assemblies. The current and prior art practice of using inconel lower grids, with their high neutron capture, is to achieve these required supporting forces. The need for the improved lower end fitting thus also results from the desire for vibration elimination which would allow use of a low parasitic material such as Zircaloy 4. Use of an integral wear-reduction-shield of the type taught in U.S. Pat. No. 4,888,149 issued to the inventor of the present invention also provides strength to the new lower end fitting.

SUMMARY OF THE INVENTION

The novel bottom nozzle or end fitting device of the invention is constructed of stainless steel and is located immediately above the lower core plate flow holes. The device is circular and has a curved profile. The geometry of the devices, their number and height, is dependent on the reactor core plate geometry and the size of the lower end fitting. The devices are rigidly held in place by members extending from the edges of the device to the lower end fitting support legs and the thimble flux shield. This stiffens the end fitting and permits a reduced thickness of the flow plate and legs. The curved shapes are parabolic type and are adjusted to optimize the diffusion of the jet to lower pressure drop. The diffusers are bell mouth in type and have a unique shape dictated by the reactor and fuel assembly design. Based on the lower core plate flow hole geometry, lower end fitting design, and the reactor flow rate, the diffuser shapes are optimized to achieve maximum jet diffusion and resultant reduction in damaging vibration of fuel rods and pressure drop due to turbulence.

The device acts as bell mouth annular diffusers causing the lower core plate flow hole jets to be diffused and evenly spread before impingement on fuel rods located above the end fitting. This results in a calculated 10% to 15% lower pressure drop for the lower end fitting. It also lowers the jet flow impingement on the assembly's fuel rods. Less jet flow impingement results in lower fuel rod wear due to flow induced vibration of the fuel rods. The addition of these devices are also used as structural members of the end fitting. The devices and members and their placement results in thinner lower end fitting legs, smaller lower end fitting gussets, and thinner flow plates while still maintaining the original strength of the lower end fitting.

DETAILED DESCRIPTION OF THE ILLUSTRATED EMBODIMENT

Figure 1:
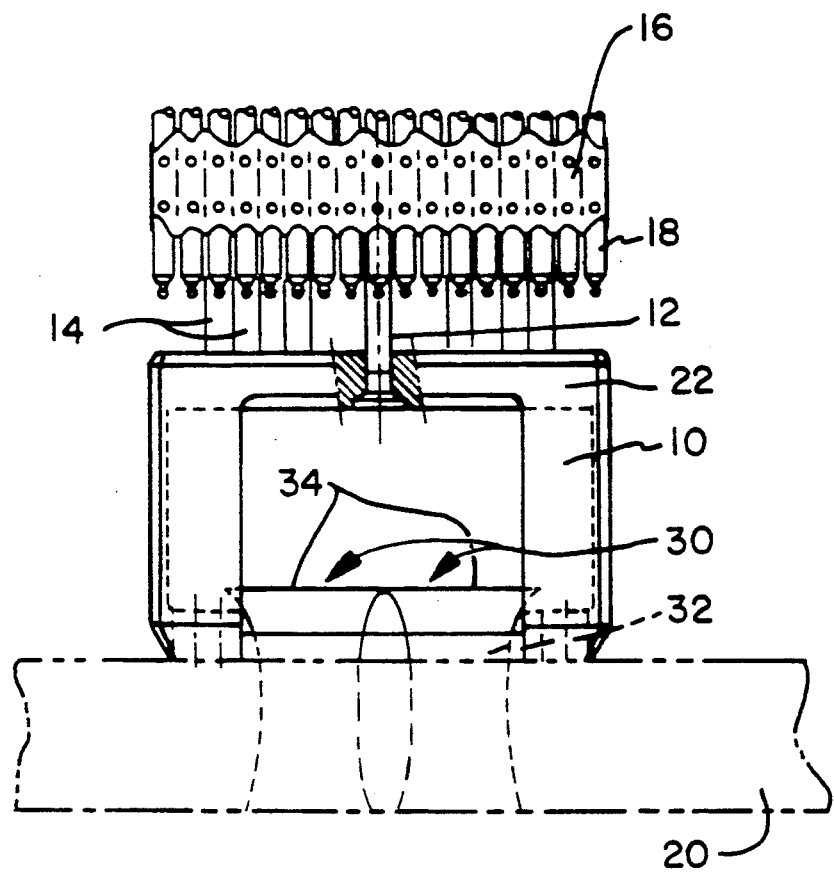
FIG. 1 is a partial schematic elevational view of the lower end of a pressurized water nuclear reactor fuel assembly with the improved lower end fitting of the invention and associated core plate.

The number 10 generally designates the improved lower end fitting constructed according to the invention. The end fitting 10 is attached by means of instrumentation tube 12 and guide tubes 14 to the remaining fuel assembly structure, as represented by lower grid 16 and fuel rods 18 partially shown in FIG. 1. A typical pressurized water nuclear reactor lower core plate 20 is shown in dotted lines in FIG. 1.

Diffusing flow between the multi-holed lower core plate 20 and the multi-holed top flow plate 22 of the lower end fitting, below the fuel rods 18, are the bell mouth type flow diffusers 30.

As flow in the reactor core leaves the openings 24 in lower core plate 20 it is directed to and enters the lower end and smaller ends 32 of diffusers 30.

Figure 3:
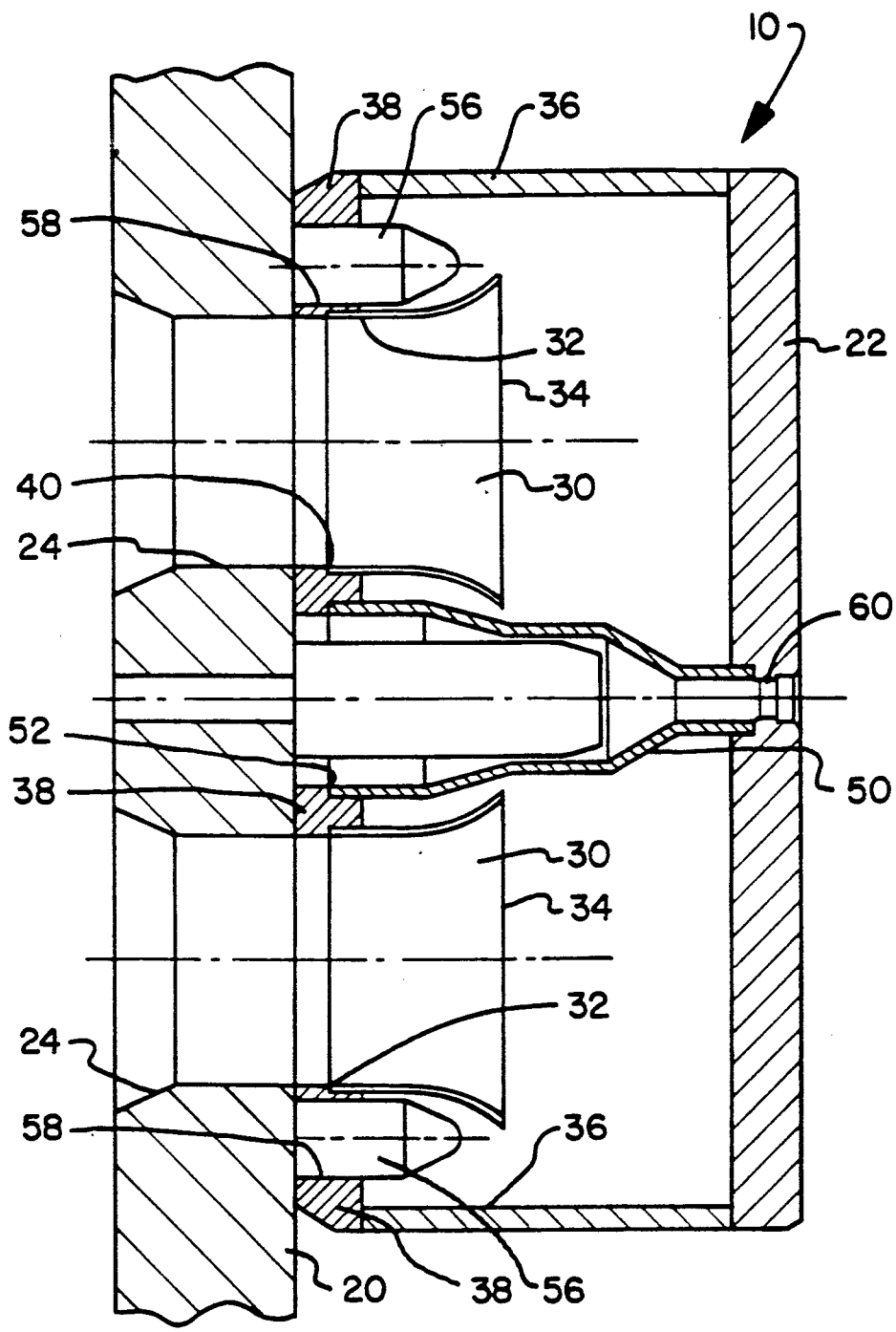
FIG. 3 is a cross-section along the line 3—3 of FIG. 2 and through the adjacent core plate portion.
Figure 4:
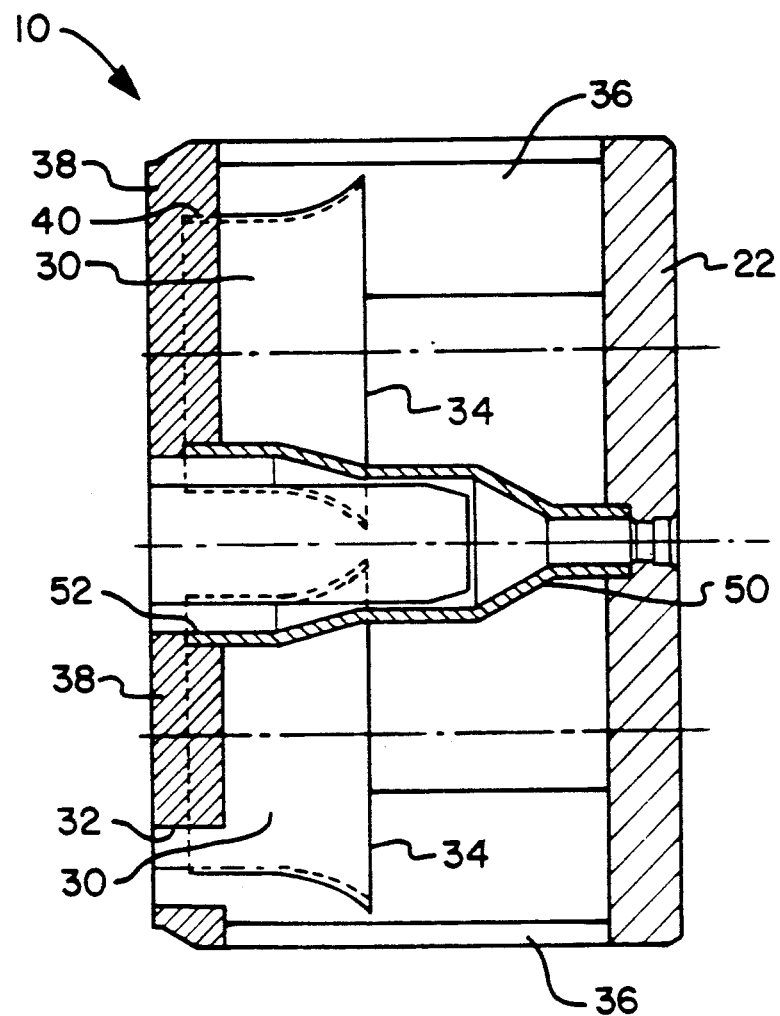
FIG. 4 is a cross-section taken along the line 4—4 of FIG. 2.

As seen in FIGS. 3 and 4, the curved shape from smaller end 32 to larger output end 34 of each diffuser 30 is a parabolic type adjusted in their bell mouth shape in a manner dictated by the particular lower core plate flow hole geometry, lower end fitting design, and the reaction flow rate to achieve maximum jet diffusion. This, in turn, produces a resultant reduction in damaging vibration of fuel rods 18 and pressure drop through turbulence.

The diffusers also act to stiffen the lower end fitting 10 by being rigidly connected to the legs 36 at the corners of the lower end fitting by horizontal webs 38 which are integral with legs 36. The diffusers 30 are mounted in recesses in webs 38 defined by counterbore 40.

Figure 2:
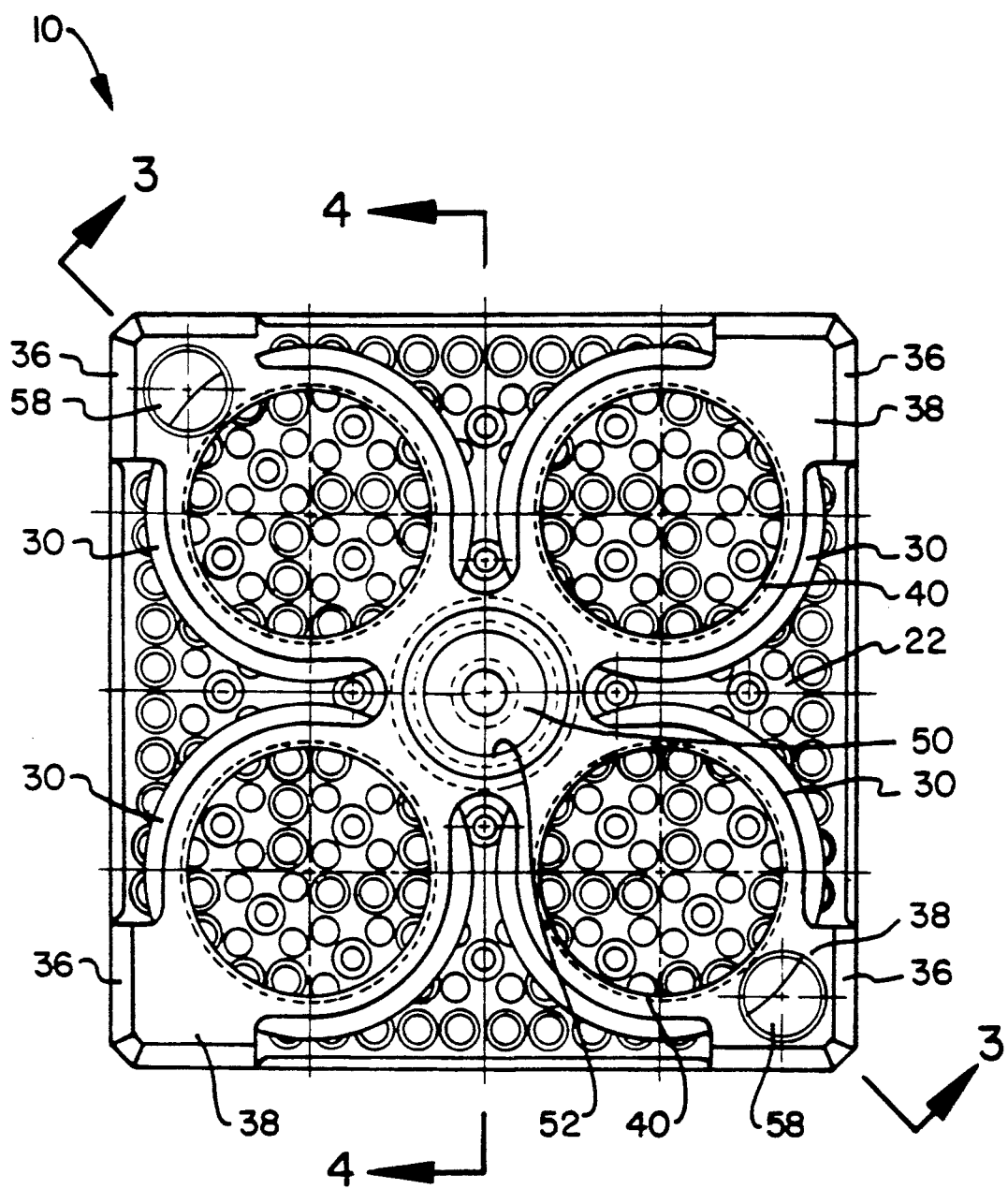
FIG. 2 is a detailed bottom view of the lower end fitting of the invention showing an integral wear-reduction shield for thimbles.

Also adding rigidity to the lower end fitting is a wear-reduction-shield 50 mounted in a central opening 52 in web 38. The opening 52 and web 38 form a hub which provides the central opening for an in-core-instrumentation thimble (not shown). This structure will be clearly understood from reading my U.S. Pat. No. 4,888,149. It will be apparent from the drawings here presented as FIGS. 2-4, that wear-reduction-shield 50 will, when the proper relationship between lower end fitting 10 and the core plate 20 are established by pins 56 and holes 58 in web 38, act further to stiffen the end fitting 10. Moreover, the relationship of shield 50 to a counterbore 60 in top flow plate 22 and counterbore 52 is such that it will help prevent tilting or tipping of the end fitting 10 and therefore prevent legs 36 from entering holes 24 in core plate 20. Again, see my U.S. Pat. No. 4,888,149.

I claim:

1. An improved lower end fitting for a fuel rod containing fuel assembly of a pressurized water nuclear reactor, said lower end fitting having a top flow plate, and legs for engaging a lower core plate of said reactor and comprising:

means for diffusing flow between the lower core plate and the lower end fitting top flow plate below the fuel rods, which diffusion spreads and even flow in a manner which minimizes jet flow impingement on fuel rods above the lower end fitting and therefore reduces fuel rod vibration and fuel assembly pressure drop;

said means for diffusion flow also acting as a means for stiffening the lower end fitting be being rigidly connected to the legs of the end fitting, thereby permitting said legs and flow plate to be thinner and of less mass and said means for diffusion being of a shape and dimension relative to holes in the reactor core plate such that it acts to eliminate the possibility of said thinner legs entering said holes in the reactor core plate.

2. The improved lower end fitting of claim 1 in which a wear-reduction-shield for thimbles is provided centrally of the structure and acts further to stiffen the end fitting as well as prevent its legs from entering holes in the reactor core plate.

* * * * *